March 24, 1970     G. RITZERFELD     3,502,262
RECORD CARRIER CONTROLLED PRINTING AND RECORDING APPARATUS
Filed Dec. 13, 1967     12 Sheets-Sheet 1

Fig. 1

Inventor:
Gerhard Ritzerfeld
By Michael S. Striker
A Horney

March 24, 1970   G. RITZERFELD   3,502,262
RECORD CARRIER CONTROLLED PRINTING AND RECORDING APPARATUS
Filed Dec. 13, 1967   12 Sheets-Sheet 5

Fig. 5

Inventor:
Gerhard Ritzerfeld
By Michael S. Striker
Attorney

March 24, 1970          G. RITZERFELD          3,502,262
RECORD CARRIER CONTROLLED PRINTING AND RECORDING APPARATUS
Filed Dec. 13, 1967          12 Sheets-Sheet 9

Inventor:
Gerhard Ritzerfeld
By Michael S. Straker
Attorney

Fig. 10

United States Patent Office 3,502,262
Patented Mar. 24, 1970

3,502,262
RECORD CARRIER CONTROLLED PRINTING AND RECORDING APPARATUS
Gerhard Ritzerfeld, Franzensboder Str. 21, Berlin-Grunewald, Germany
Filed Dec. 13, 1967, Ser. No. 690,358
Claims priority, application Germany, Dec. 16, 1966, R 44,829
Int. Cl. G06k 1/20
U.S. Cl. 234—35    10 Claims

ABSTRACT OF THE DISCLOSURE

A card is imprinted by a printing machine with information, and punched by a punching device with the same information. Punching operations take place under control of read-out means which sense information on a record carrier and set the punching device accordingly. The record carrier is transported in synchronism with the punching operations, and independently of the printing operations so that the printing machine and the punching device can operate at different speeds.

BACKGROUND OF THE INVENTION

The present invention relates to apparatus by which the same information is printed and punched, or otherwise recorded, on a card. The printing on cards may be carried out in a duplicating machine which prints selected lines of a printing form on the card. In previously filed applications, I have disclosed apparatus in which the printing and punching of the cards is carried out in synchronism, and the punching operations are synchronized with the revolutions of the printing drum which carries the printing form.

When a complicated punching device having between 60 and 80 punches is used to punch all holes simultaneously into the card in the rhythm of the revolutions of the printing drum, difficulties were encountered. Irrespective of the high cost of the punching device, which is about three times the cost of the printing machine, such as a rotary duplicator, the speed of the duplicating machine has to be reduced to correspond to the maximum speed at which the punching device is capable of punching 60 to 80 holes simultaneously.

It is also known to provide a read-out device or sensing device for reading out information from a record carrier which is transported to the read-out means in synchronism with the printing machine, while the read out information is used for controlling the punching device. When the printing machine is controlled to selectively print different lines of the printing form on a card, the record carrier is transported so that information corresponding to the new line is read out and transmitted to the punching device so that the read-out device and consequently the punching device, operates in synchronism with the printing operations of the printing machine.

SUMMARY OF THE INVENTION

It is one object of the invention to overcome the disadvantages of known apparatus for printing and recording the same information on a card, and to provide an apparatus serving this purpose which can be economically manufactured and permits operation of the printing machine and of the recording device at different appropriate speeds.

Another object of the invention is to provide a transporting device for transporting a record carrier in synchronism with the operations of a recording device controlled by read-out means sensing the record carrier, so that the speed of the printing machine has no influence on the movements of the record carrier.

In accordance with the invention, the working rhythm of the duplicating machine for printing the cards with selected lines of the printing form, and the working rhythm of the read-out device for sensing on a record carrier, lines of recordings respectively correlated with the printed lines, are not synchronized, and the working rhythm of the read-out device depends only on the working rhythm of the recording device, such as a punching device.

In accordance with the invention, the cards imprinted by the duplicating machine actuate mechanical, electrical, or optical switches while transported to, or arriving at the recording device, and these switches control the transporting device for transporting the record carrier to the read-out device in such a manner that those recordings of the record carrier are sensed whose information is to be recorded on the card. The control of the read-out device consequently depends on the working rhythm of the recording or punching device.

Preferably, card transporting means are provided for transporting the card from the printing machine to the recording device, and switches in the path of the transported card are successively operated so that the card is stopped in successive recording positions, and is punched in each of the recording positions with a part of the information contained in the respective line of recordings of the record carrier. In dependence on the respective positions of the card in relation to the punching device, for example, sets of relay contacts are successively effective on an intermediate storage means, or decoding device, or directly on the read-out device, depending on the information which is to be recorded in each position of the card.

The arrival of the card at the recording device is indicated by mechanical, electrical or optical switches which control the transporting device for the record carrier to shift the same a step corresponding to the spacing of successive lines of recordings on the record carrier.

Preferably, the information is recorded in coded form on the record carrier, and a code using four or five code elements may be used. The sensed information is introduced into a decoding device, for example a relay decoder, which serves at the same time as an intermediate storage, and the respective positions or groups of positions are successively transmitted under the control of an interrogation device, or by its card transporting means which transports the cards to the recording members or punches.

In a further development of the invention, upon sensing of the first line or lines of recordings of the record carrier, the sensed information is introduced through a switching device into a second permanent storage device or decoding device whose data remain stored for a number of cards, and which is interrogated by each card entering the recording device, so that the respective information is additionally recorded on the cards.

In a further development of the invention, an additional manually operated introducing device for variable data is provided, which are stored independently of the sensing of the record carrier by means of a storage device, such as a contact field, and which are interrogated by an interrogating device of the recording device for each card passing through the recording device so that additional information is punched into the card.

A particular advantage of the invention is that due to the fact that the working rhythm of the printing machine is independent of the working rhythm of the punching device and read-out device including transporting means for the record carrier, the printing machine can operate at a far higher speed than the maximum speed of a recording device, such as a punching device. Consequently, it is possible to use punching devices which punch groups of holes in successive punching strokes, each group representing part of the read out information, and it is even possible to use punches for punching single holes or lines of holes. The lag of the production of punched cards as compared with the production of printed cards does not cause any disturbance or delay, since during this time additional operations, for example the exchange of printing forms, setting of stamping devices, and other auxiliary operations, can be carried out. Furthermore, it is possible to start the printing of the entire text of a printing form while the last cards printed by the preceding printing form are still being punched.

An arrangement according to the invention comprises a printing machine, such as a duplicating machine having a printing form, for imprinting cards with legible information, a recording device, such as a punching device, for recording or punching the same information into the cards; first and second means for actuating the printing machine and the recording device to perform on the cards printing and recording operations, respectively, independently of each other; read-out means connected with the recording device for setting the same to record read out information; a transporting device for transporting to the read-out means, a record carrier having recordings, such as punched holes, representing the information; and control means connecting the recording device with the transporting device so that the record carrier is transported, its recordings are read out, and the recording device is set, in synchronism with the recording operations and independently of the printing operations of the printing machine.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawings.

DESCRIPTION OF THE PREFERRED EMBODIMENTS

Figure 1:
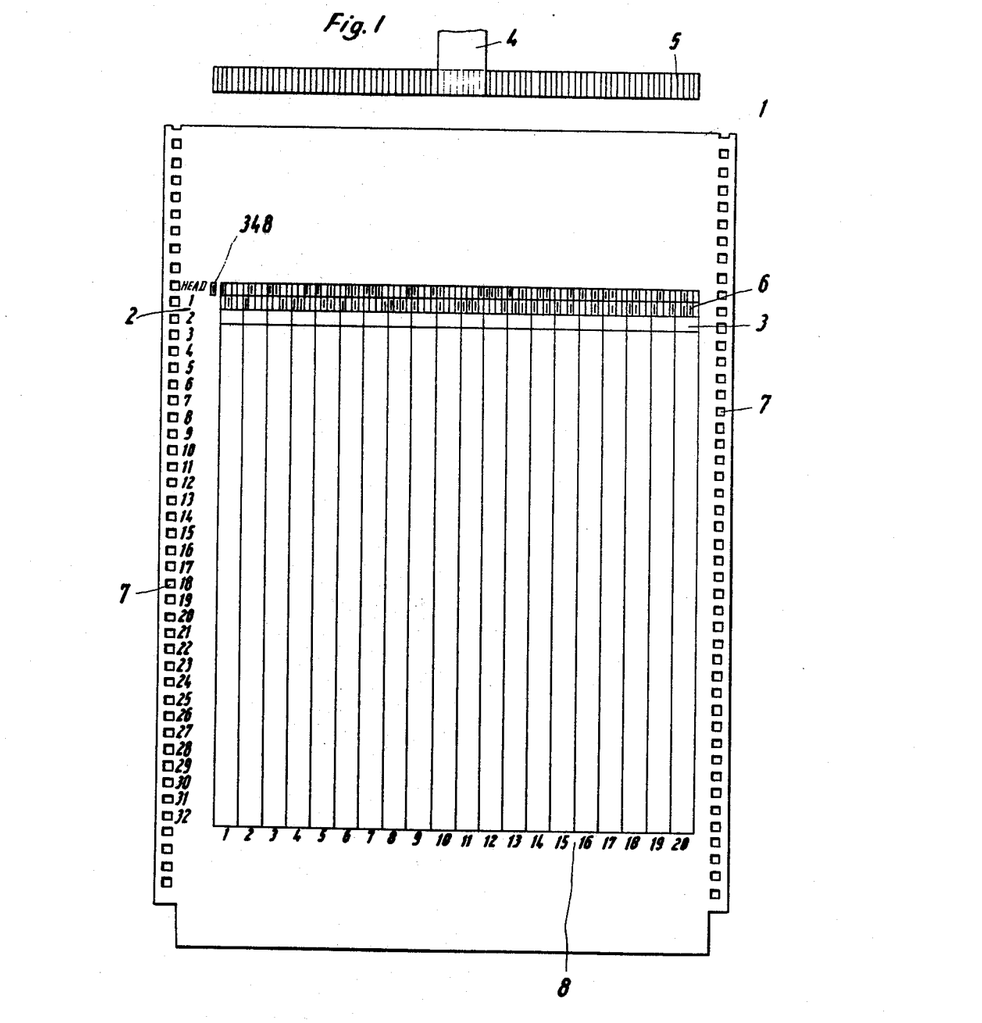
FIG. 1 is a schematic view illustrating a record carrier and a set of brushes for reading out the record carrier.

FIG. 1 illustrates a record carrier 1 in the form of a punch card which may have the standard DIN $A_4$ format. Record carrier 1 has recording areas 3 arranged in thirty-three lines, and twenty columns. The vertical column 2 indicates the "head" line in which information pertaining to a heading or title is recorded, and thirty-two lines in which information pertaining to text lines is recorded. Each line has twenty areas or positions 3, indicated by the numbers in the line 8. Information representing the digits from 0 to 9 can be recorded in each area 3 in coded form, and in the illustrated example, each area 3 has four adjacent fields in which code elements 6 are punched in different positions and combinations for representing digits. One brush 5 is provided for sensing each field so that eighty brushes sense the twenty areas 3 of each line, an additional eighty-first brush being provided for sensing a control field 348. Transporting holes 7 along the edges of the record carrier 1 are engaged by sprockets for transporting the record carrier under the brush means 4 and brushes 5. Instead of punched holes 6, other markings, which can be optically read out, may be provided.

Figure 2:
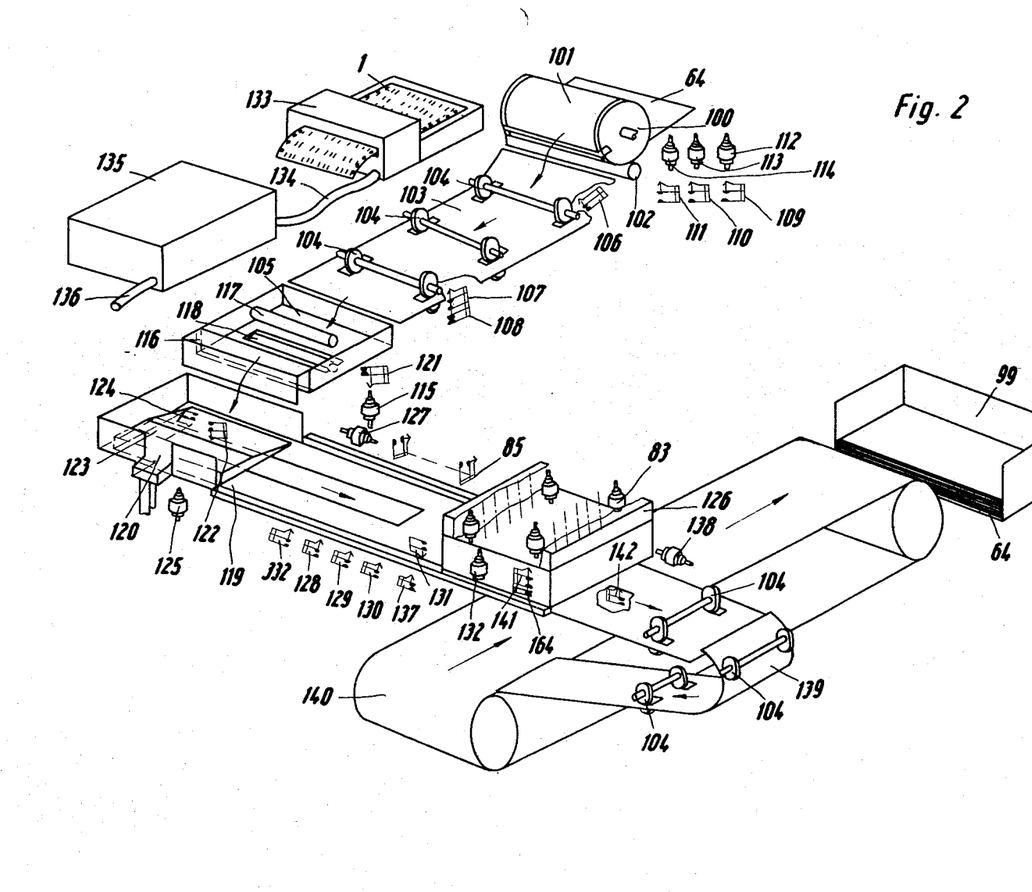
FIG. 2 is a fragmentary schematic perspective view diagrammatically illustrating a printing and punching arrangement according to the invention.

FIG. 2 diagrammatically illustrates a preferred arrangement of the invention for printing and punching a punch card 64. The punch card is supplied to a printing machine, preferably a duplicating machine, represented in FIG. 2 by a printing roller 100 carrying a printing form 101, and by a counterpressure roller 102. The entire text of the printing form, or selected head and text sections, for example lines, are printed on card 64 whereupon the card is discharged to a transporting guide plate 103 and transported by transporting rollers 104 to a card storage means 105. The transported card first closes switch 106 and then switch 107, and opens a switch 108 simultaneously with the closing of switch 107. The circuits of the switches shown in FIG. 2 will be described in greater detail with reference to FIGS. 3 and 12. When switch 107 closes, an electromagnet 115 which controls a stop 116 is energized which effects by control means, not shown, the raising of the stop means 116 and a downward movement of transporting roller 117. A card 64 which was transported by transporting rollers 104 into the card storage means 105, is now transported by transporting rollers 117 and 118 out of the opened card storage means 105 and supplied to card transporting means 119 which includes a holding means 120 which is raised by the control means of stop means 116 and of transporting roller 117, which preferably include cam means and cam follower means driven through a one revolution clutch. When transporting roller 117 rises, and stop means 116 closes the path of the card, holding means 120 drops onto the card 64 and holds the same by its weight. The control cams are arranged in such a manner that after the closing of switch 107, stop means 116 is opened, holding means 120 is raised, and transporting roller 117 is lowered only when card 64 has been transported into the card storage device 105.

Figure 9:
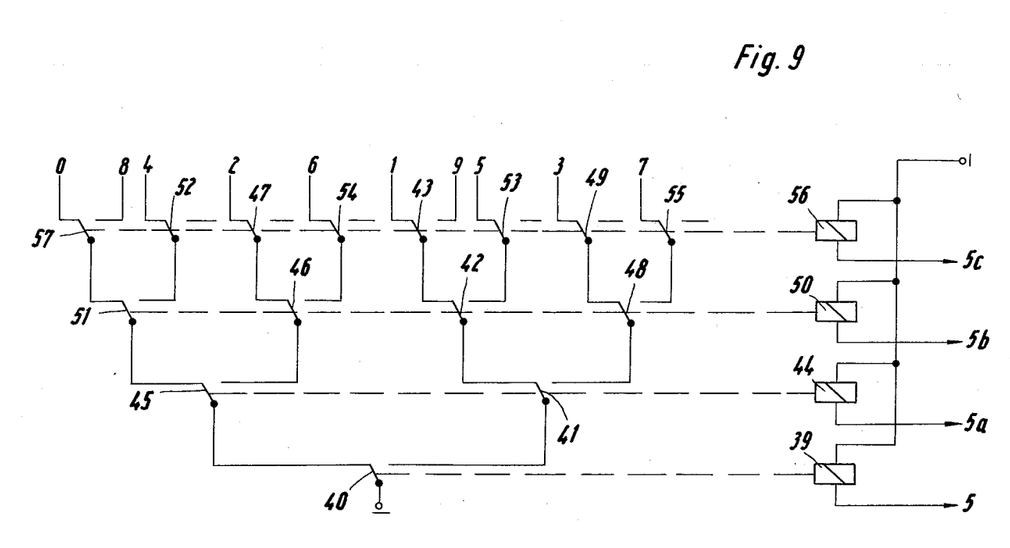
FIG. 9 is a diagram illustrating an electric circuit for reading out and decoding coded information recorded in a text line of the record carrier.

The energized electromagnet 115 opens switch 121. Card 64 in the device 119 closes a switch 122, while the card knife 123, which is in its normal position, closes switch 124. The closed switch 122 energizes electromagnet 125 to start the movement of the card knife 123 which transports card 64 in the direction toward the punching station 126 until it is taken by a card slide, not shown. Electromagnet 127, which causes start of the movement of the card slide, is energized by a switch 141 which is actuated under the control of shaft 65 as shown in FIG. 9, whereupon the switches 128, 129, 130 and 332 are effective to energize electromagnet 127 since card 64 is punched in four punching strokes, each of which may produce fourteen punched holes.

Figure 11:
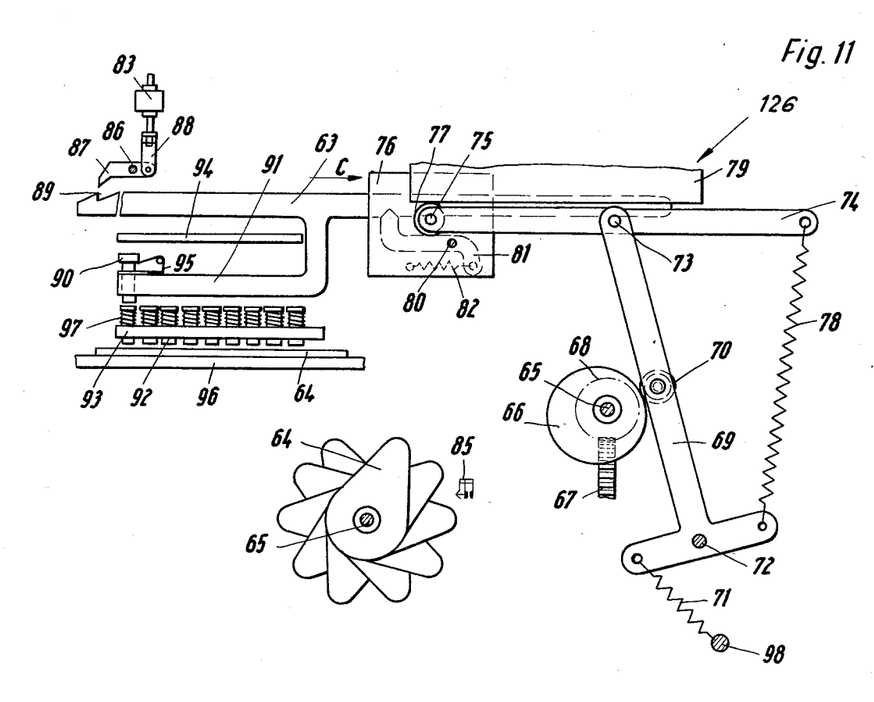
FIG. 11 is a fragmentary schematic side elevation illustrating setting means of a punching device.

Before card 64 enters punching device 126, it closes a switch 131 which energizes electromagnet 132 which causes turning movement of shaft 65 shown in FIG. 11.

Information read out from record carrier 1 by the read-out device 133 is transmitted through cable 134 into the decoding device 135 and from there transmitted through cable 136 to the punching device as will be explained with reference to FIGS. 8 and 9. Ten switches 85 are arranged in a row and are consecutively operated by cam lugs 84 shown in FIG. 11 so that electromagnets 83, whose number may be 14, are energized in accordance with the read out value, and effect the setting of the punch actuators 63, as will be described with reference to FIG. 11. In the punching device 126, and behind the same, card 64 closes two control switches 141 and 142. Switch 137, which was held open during the punching operations by the card 64, closes upon completion of the punching operation. Electromagnet 138 is energized and effects the discharge of the punched card which is transported by transporting rollers 104 over a guide plate 139 to a running endless conveyor belt 140 which transports the card to the receptacle 99. When switch 106 closes, one of the switches 109, 110 or 111 of the printing machine is manually operated to energize one of the magnets 112, 113 or 114 by which the printing machine is controlled to transport the printing form a distance corresponding to one, two, or three lines.

Figure 3:
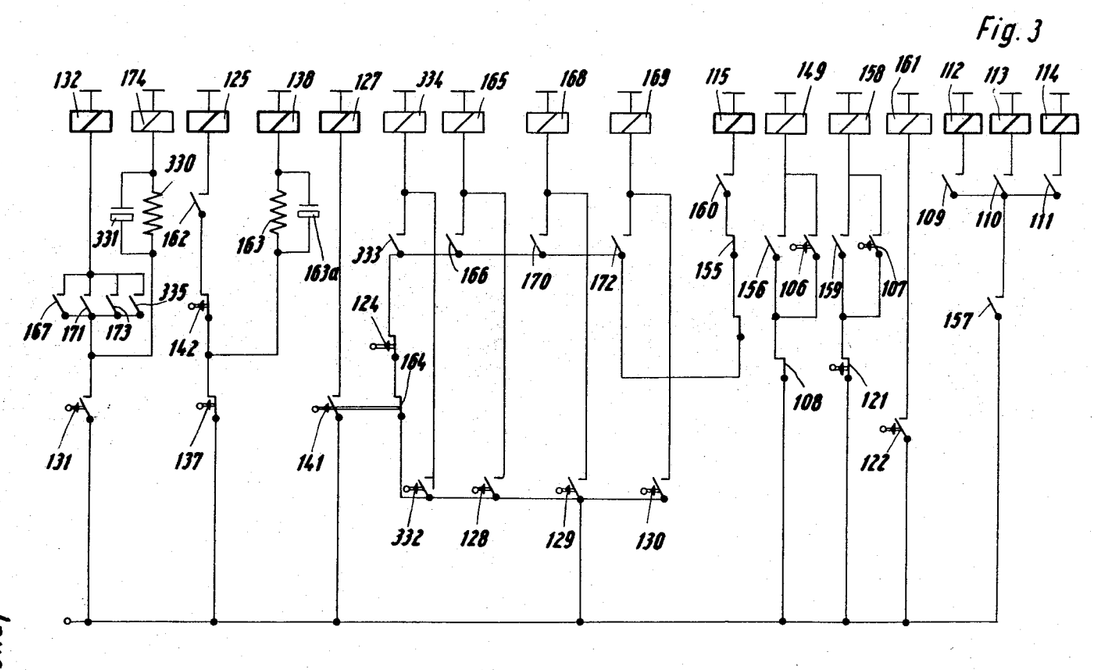
FIG. 3 is a diagram illustrating the circuit of the switches shown in FIG. 2, and including relays.

FIG. 3 illustrates the circuit of the switches described with reference to FIG. 2, which may be mechanical, electrical, or optical switches for operating the respective electromagnets. When switch 106 is closed by card 64, relay 149 is energized which opens contact 155 and closes holding contacts 156 and 157. When one of the switches 109, 110, 111 of the printing machine is actuated, the respective electromagnet 112, 113, 114 is energized. Thereupon, punch card 64 simultaneously opens switch 108 and closes switch 107. The opened switch 108 interrupts the circuit of relay 149, so that holding contacts 156, 157 open and contact 155 closes. The closed switch 107 energizes relay 158 so that the two holding contacts 159 and 160 close. Electromagnet 115 is energized and effects operation of control cams through a one revolution coupling, not shown, while simultaneously opening switch 121 so that the circuit of relay 158 is interrupted and the holding contacts 159 and 160 open again. The de-energized magnet 115 closes switch 121 again. When card 64 arrives in the device 119, it closes switch 122 which energizes relay 161 so that its holding contact is closed as long as switch 122 is held closed by card 64. The closed holding contact 162 energizes electromagnet 125 which starts the transporting movement of the card knife 132, see FIG. 2, with the card 64 thereon only if switch 137 is not opened by a not yet completely punched card 64. When switch 137 is closed again after the punching operation, a RC network (resistor capacitor network) 163, 163a shortly energizes electromagnet 138 which actuates a discharge device, not illustrated.

If switch 124, or 164, is open, it is not possible to energize electromagnet 115. When a punch card preceding the punch card 64 leaves the punching position in the punching device 126, a switch 142, which was held open by the card, is permitted to close, and it is possible to energize electromagnet 125. Switch 164 was also open, and switch 141 closed. The closed switch 141 energizes electromagnet 127 which starts movement of the transporting slide, not shown, while punch card 64 closes switch 131, whereupon the transporting slide closes switch 332. The closed switch 332 energizes relays 334 so that holding contacts 333 and 167 energize electromagnet 132 which effects the start of a punching operation. The transporting slide, not shown, successively engages switches 128, 129 and 130 and closes the same while relay 334 is de-energized.

The energized relays 165, 168, 169 successively close holding contacts 166 and 171, 170 and 173 and the holding contacts 172 and 335 so that additional three punching operations are started. When switch 131 closes, relay 174 is shortly energized by the RC-network 330, 331 which causes a single step of record carrier 1, as will be described with reference to FIGS. 4 to 7.

Figure 4:
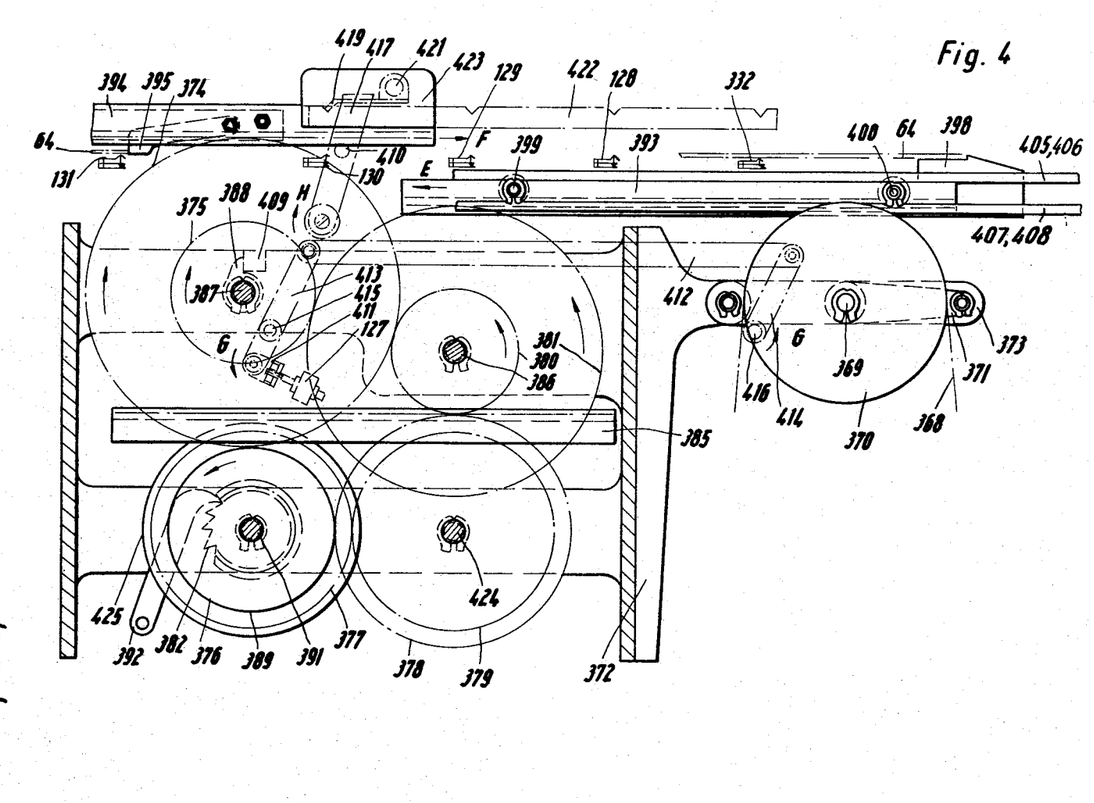
FIG. 4 is a fragmentary schematic plan view, partially in section, illustrating card transporting means for transporting the card to the recording or punching device.
Figure 5:
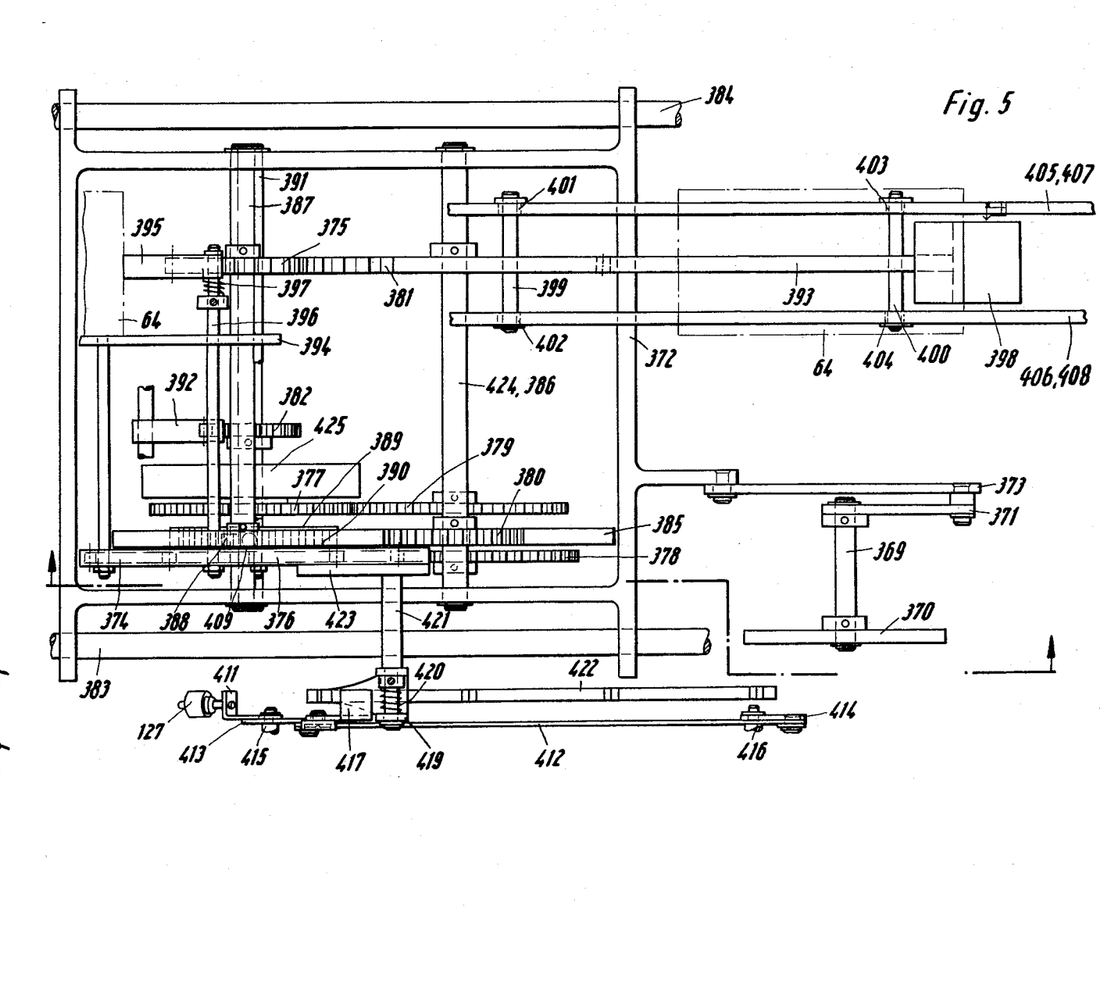
FIG. 5 is a fragmentary schematic sectional view illustrating the card transporting means of FIG. 4.

FIGS. 4 and 5 illustrate the transporting means by which the card 64 is transported to the punching device. A pulley is driven through a one revolution clutch, not shown, by a motor, not shown and connected by a belt 368 to a pulley 370 secured to shaft 369, so that the shaft 369 performs one revolution for each operation. A crank 371 is also fixed to shaft 369 and is connected with a connecting rod 373 so that after a revolution of pulley 370, supporting slide 372 again assumes the position shown in FIG. 4. Slide 372 supports gears 374 to 381 and a locking wheel 382 and is displaced with the same along guide rails 383, 384. During movement of slide 372, gear 380 is turned by the stationary rack bar 385, and the turning movement is transmitted through gear 381 to gear 375 and its shaft 387 and coupling pawl 388 on shaft 387 to gear 374 which has a coupling part 409 cooperating with coupling pawl 388.

Gear 374 drives the gear rim 376 of a spring housing 387 so that a spiral spring 390 which is fixedly connected with the spring housing 389 and shaft 391, is tensioned since shaft 391 cannot turn due to the engagement of the locking pawl 392 with the locking wheel 382. The gear rim 376 drives a gear 378 whose turning motion is transmitted by shaft 424 to gear 379 which drives gear 377 of a centrifugal brake 425.

During the first half of a revolution of crank 371, the turning movement of gear 381 moves rack bar 397 in the direction of the arrow E, while the turning movement of gear 374 moves rack bar 394 in the direction of the arrow F. The pivoted coupling and transporting member 395 is connected by shaft 396 with rack bar 394, and is biased by a spring 397 to engage a table surface, not shown, along which card 64 is transported.

Card knife 398 is fixedly connected with rack bar 393 which is movably mounted on stationary rails 405, 406, 407, 408 by means of shafts 399, 400 and rollers 401 to 404.

When a punch card 64 is received, it slides under the coupling member 395 far enough so that the coupling member 395 reliably falls behind the trailing edge of card 64 to further transport the same.

During the second half of the revolution of crank 371, housing support 372 is again moved in the direction of the arrow F. The direction of rotation of gear 380 is thereby reversed, and causes a movement of card knife 398 in the direction of the arrow F by gear 381 and rack bar 393. At the same time, coupling pawl 388 turns in the reverse direction of rotation and moves away from the coupling portion 409 of gear 374.

The transport of coupling member 395 in the direction of arrow E under the punches 92 shown in FIG. 11 is effected by spring 390 in spring housing 389 which turns gears 376 and 374 and displaces rack bar 394.

This operation is controlled by card 64. When the same closes switch 131 shown in FIGS. 2, 3 and 4, record carrier 1 is moved one step so that its next line is read out as will be described with reference to FIGS. 6 and 7. At the same time, rotation of shaft 65 is started when switch 332 is closed by the actuator pin 410. It is assumed that during the transfer of card 64 from card knife 398 to transporting member 394, switch 332 is closed. Due to the turning of shaft 65, switches 141 and 164, described with reference to FIGS. 2 and 3, are operated. Closing of switch 141 has energized electromagnet 127 so that the same turns by means of link 411 and link 412, levers 413 and 414 which are mounted on stationary journals 415 and 416, the levers turning in the direction indicated by the arrow G.

Connecting link 412 presses control lever 417 with roller 418 in the direction of the arrow H, and turns pawl 419 against the force of spring 420 about shaft 421 out of one of the notches of rack bar 422. Shaft 421 is fixedly connected with a bracket 423 secured to rack bar 394. Spring 390 effects the engagement between pawl 419 and the next following notch of the rack bar 422, whereupon pin 410 closes switch 128 so that electromagnet 132, described with reference to FIG. 3, is again energized and causes a revolution of shaft 65, shown in FIG. 11.

Figure 6:
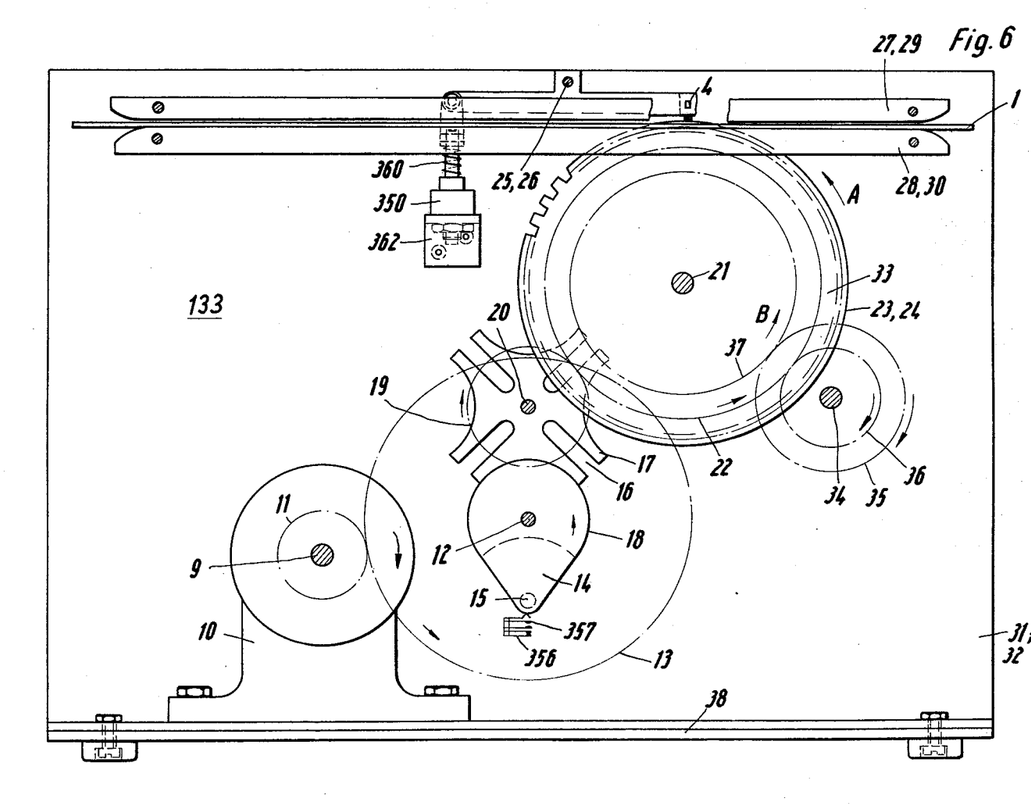
FIG. 6 is a fragmentary schematic side view, partially in section, illustrating the construction of the transporting device and the read-out means for the record carrier.
Figure 7:
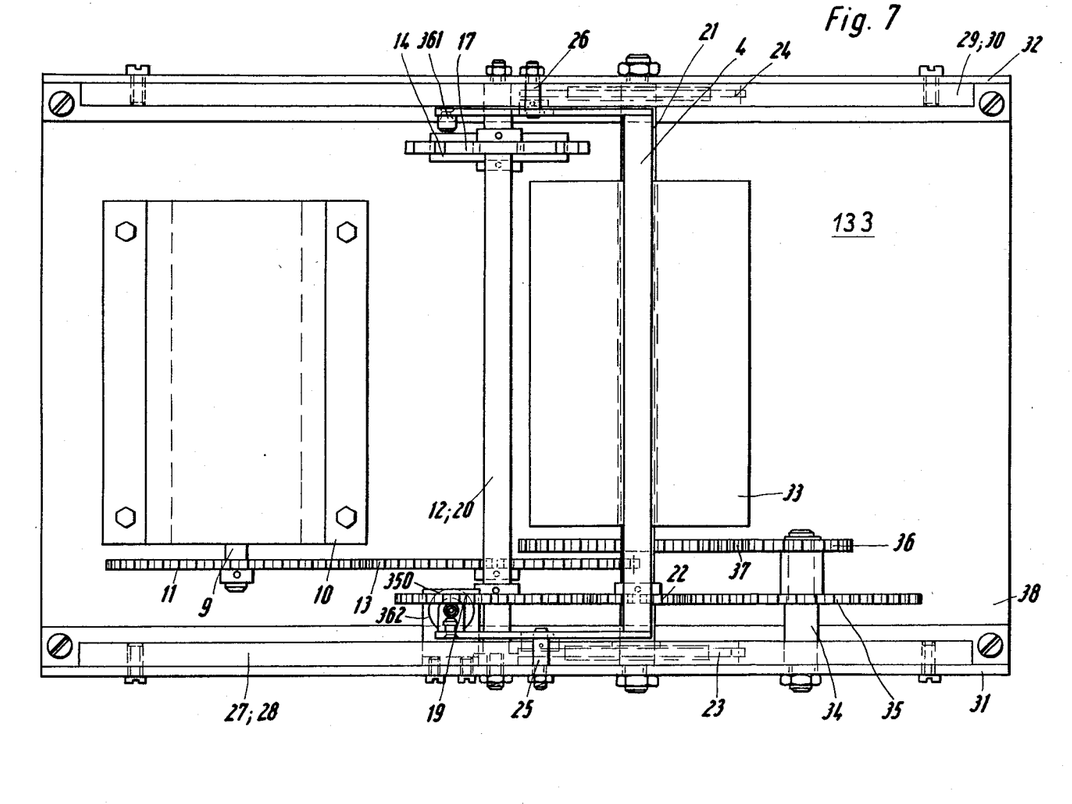
FIG. 7 is a fragmentary schematic plan view of the device shown in FIG. 6.

FIGS. 6 and 7 illustrate the read-out device 133 described with reference to FIG. 2 for reading out record carrier 1 shown in FIG. 1, and for transporting the same stepwise. A gear 11 is secured to the shaft 9 of a brake motor 10 and drives a gear 13 on a shaft 12 which carries the drive member 14 of a Geneva mechanism so that shaft 20 and a gear 19 are turned 90° when the pin 15 of drive member 14 passes into a slot 16 of the Geneva wheel 20. After turning of shaft 20 through 90°, it stops while the circular surface 18 of drive member 14 locks the Geneva wheel. When drive member 14 arrives in its initial position, brake motor 10 is stopped so that the drive member stops.

Gear 19 transmits rotation to gear 22 which is secured to shaft 21 so that the transporting sprockets 23 and 24 on shaft 21 move record carrier 1 one step in the direction of the arrow A.

Brush means 4, mounted on journals 25 and 26 for pivotal movement, include brushes 5, see FIG. 1, for sensing record carrier 1. When an electromagnet 350 mounted on a bracket 362, is energized, as will be described with reference to FIG. 8, brush means 4 turns about journals 25 and 26 and brushes 5 are lifted. Record carrier 1 is guided along guide rails 27, 28, 29 and 30 secured to side walls 31 and 32. In order to prevent oxidizing of a contact roller 33 which is mounted for turning movement on shaft 21, gear 37, which is fixedly connected with contact roller 33, is rotated in the direction of the arrow B since rotary motion is transmitted from gear 22 and a pair of intermediate gears 35, 36 which are mounted on journal 34.

The arrangement of the gears is such that the turning movement of contact roller 33 during one step of record carrier 1 is greater than the turning movement of transporting gears 23 and 24.

If it is necessary to reverse the direction of movement of record carrier 1, a switch, not shown, reverses the direction of rotation of brake motor 10.

Figure 8:
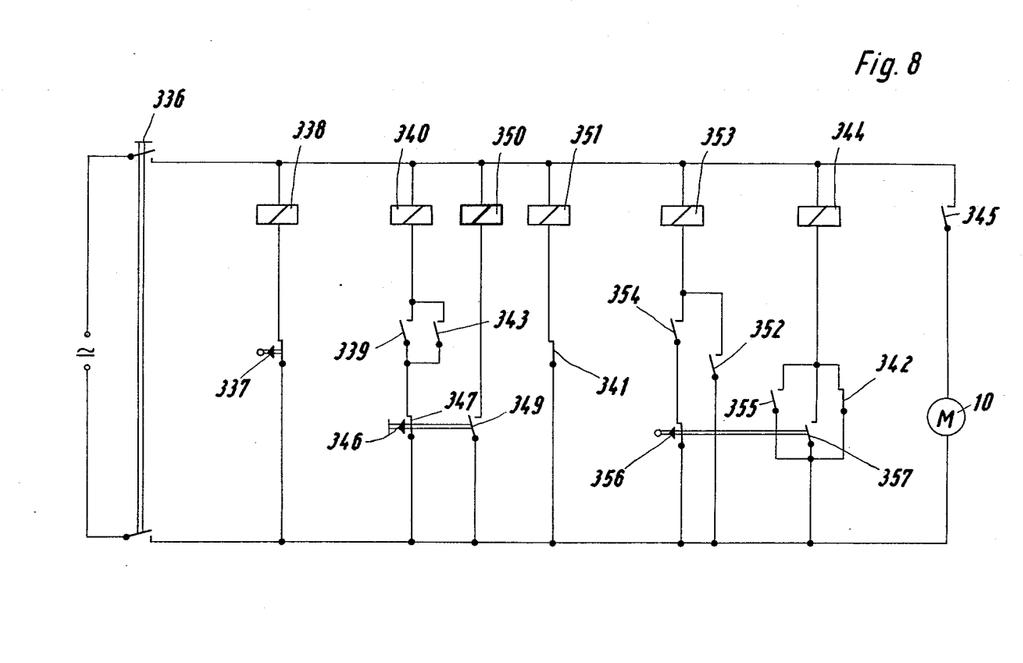
FIG. 8 is a diagram illustrating an electric circuit for controlling the read-out device and the transporting device shown in FIGS. 6 and 7.

FIG. 8 illustrates the circuit for controlling the read-out device. After main switch 336 is closed, the circuit of a relay 338 is completed over the closed switch 337 so that the energized relay closes holding contact 339. Relay 340 is energized and actuates the contacts 341 and 342, closing the holding contacts 343 and 150, shown in FIG. 12. Relay 344 cannot be energized, and since contact 345 is open, motor 10 cannot be started. When a pushbutton 346 is shortly depressed, relay 340 is de-energized by the opened switch 347, and contact 342 closes. Relay 344 is energized, and holding contact 345 closed.

The motor 10 is started and transports the record carrier 1, as described with reference to FIGS. 6 and 7, and switch 337 is simultaneously opened until the "head" line of twenty areas 3 arrives in a position under the brushes 5 of brush means 4. When contact 342 closes, holding switch 350 opens, so that the information read out from the "head" line of the preceding record carrier 1 is cleared, assuming that the main switch 336 was not opened during the exchange of the record carriers.

Figure 12:
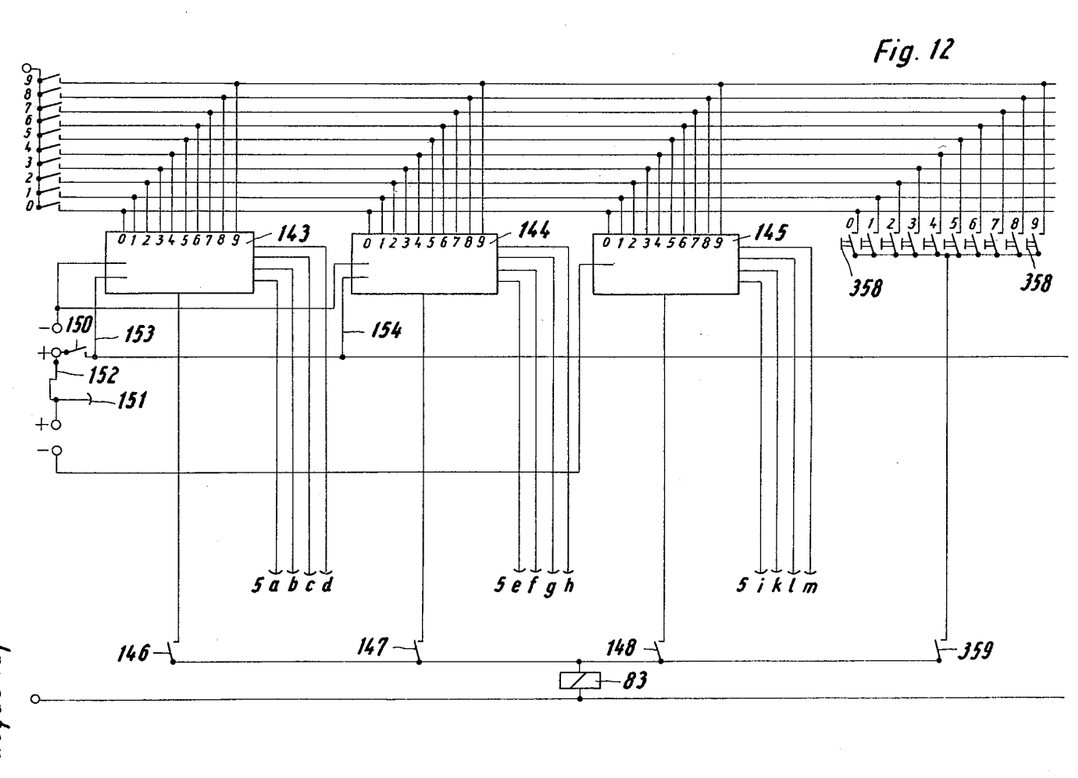
FIG. 12 is a diagram illustrating the circuit of the read-out device and decoding device by which the setting means of the punching device are controlled in accordance with the information recorded on the record carrier.

When switch 347 was opened, switch 349 was closed, electromagnet 350 energized, and the tilting movement of brush beams 4, 5 was produced. When the "head" line of record carrier 1 is sensed by brushes 5 of brush means 4, switch 337 is closed due to a command impulse produced by a hole in control field 348 shown in FIG. 1. Relay 338 closes contact 339 so that relay 340 is energized and opens contact 342. Relay 344 is again de-energized, holding contact 345 opened, and motor 10 stopped so that the record carrier is stopped and the headline remains under brush means 4, 5. When relay 340 is de-energized, contact 341 is closed and relay 351 is energized so that holding contact 152, shown in FIG. 12, is closed and performs its function which will be described with reference to FIG. 12.

As described with reference to FIG. 2, switch 131 is closed by the printed card 64, and relay 174 is shortly energized by means of the RC-network 330, 331. Holding contact 352 of relay 174 is closed, and relay 353 is energized, so that the two holding contacts 354 and 355 are also closed.

Holding contact 352 opens since relay 174 is deenergized so that relay 353 is held by holding contact 354. Relay 344 is energized and closes holding contact 345. Motor 10 transports record carrier 1 until the first text line of record carrier 1, following the headline, is under the brushes 5, 4.

When drive member 14 turns out of its initial position shown in FIG. 6, it closes switch 357 and opens switch 356. Relay 353 is de-energized, and holding contacts 354 and 355 open again. The closed switch 357, energizes relay 344 until the Geneva wheel 17 is again stopped after record carrier 1 has moved one step. Switch 356 is closed, switch 357 is opened, relay 344 is de-energized, holding contact 345 is opened, and motor 10 is de-energized.

If it is desired to remove record carrier 1 from the read-out device, pushbutton 346 is shortly actuated so that switch 347 de-energizes relay 340, contact 342 closes again, and motor 10 transports record carrier 1 until the same passes beyond switch 337 so that switch 337 is closed and energized relay 340 whereby holding contact 339 closes and energizes relay 338 which opens contact 342 so that motor 10 is again de-energized.

FIG. 9 illustrates the circuit by which the coded information recorded in one area 3 of the line of record carrier 1 is decoded and stored, four brushes 5, 5a, 5b, 5c respectively sensing the four fields of an area 3. If in an area 3, the first field is punched with a hole, brush 5 senses it since the circuit of relay 39 is closed by brush 5 engaging contact roller 33, see FIG. 6, through the punched holes in record carrier 1. Relay 39 is energized and operates switch 40. Switches 40, 41, 42 and 43 energize a punching magnet controlling a punch correlated with a position on a conventional punch card representing the value 1, as will be explained in greater detail with reference to FIG. 11. When relay 45 is energized through brush 5a, switches 40, 45, 46 and 47 energize a punching magnet correlated with the position of the punch card representing the value 2. When relays 39 and 44 are energized, a punching magnet representing the value 3 is energized through switches 40, 41, 48, 49. If relay 50 of brush 5b is energized, switches 40, 45, 51 and 52 operate a punching magnet correlated with the value 4. If relays 39 and 50 are energized, switches 40, 41, 42 and 43 operate a punching magnet correlated with the value 5. If relays 44 and 50 are energized, switches 40, 45, 46 and 54 operate a punching magnet correlated with the value 6. When relays 39, 40 and 50 are energized, switches 40, 41, 48 and 55 energize a punching magnet representing the value 7. If relay 56 is energized by brush 5c, switches 40, 45, 51 and 57 energize a punching magnet representing the value 8. If relays 39 and 56 are energized, switches 40, 41, 42 and 43 operate a punching magnet correlated with the value 9. If no relay is energized, switches 40, 45, 51 and 57 energize a punching magnet representing the value zero.

When record carrier 1 is transported to the next line position, brushes 5, 5a, 5b and 5c read out the area 3 in the same column of the next following line. During the step of record carrier 1, relays 39, 44, 50 and 56 are deenergized, and are again energized in accordance with the punched holes in the next following line of areas 3 of the record carrier.

Figure 10:
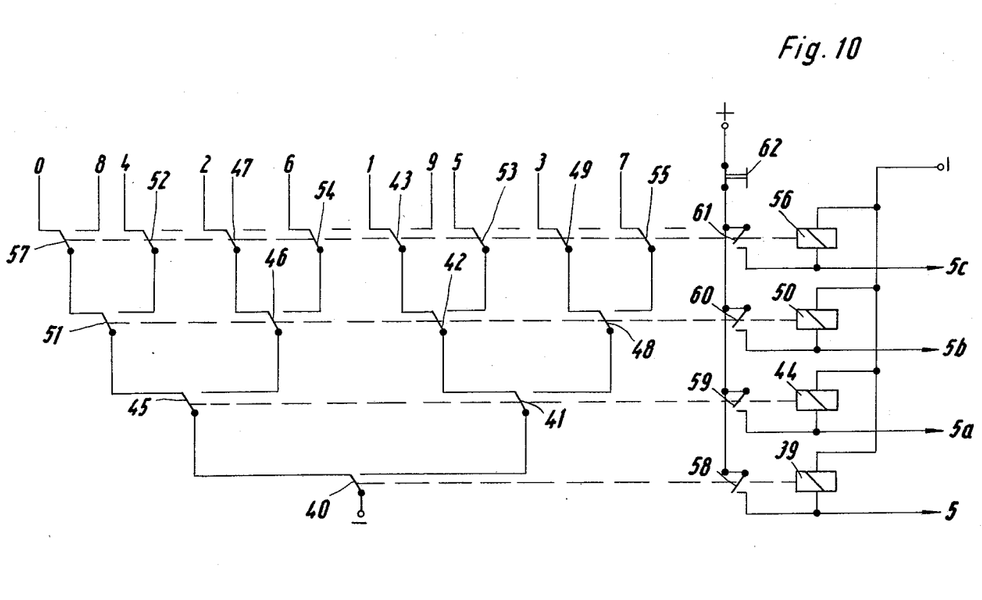
FIG. 10 is a diagram illustrating an electric circuit for reading out, decoding, and storing information recorded in a "head" line of the record carrier.

FIG. 10 illustrates the circuit for storing and decoding one position of the line of the record carrier representing the information of a heading or title. The decoding takes place the same way as described for the decoding of a text line 1 to 32 described with reference to FIG. 9. If brushes 5, 5a, 5b and 5c sense punched holes in the record carrier 1, one or several of the relays 39, 44, 50 and 56 are energized so that the respective switches of the four switches 58, 59, 60 and 61 are closed. If record carrier 1 performs one or several line steps, the introduced values, stored in relays 39, 40, 50 and 56, are not cleared since each energized relay holds itself by closing the respective associated switch 58 to 61. The manually operated switch 62 clears the head information. It is also possible to operate the clearing switch 62 by a mechanical part of the read-out device.

FIG. 11 illustrates the setting of the punching device for punching a read out value. A row of punch actuators whose number may be 14, is provided, each punch actuator having an arm 91 on which a hammer 90 biased by spring 94 is mounted. A row of punches 92 is mounted in bores of a holder 93 above a punch card 64 which rests on a base plate 96. Springs 97 urge the punches 92 into a higher inoperative position. Nine punches are provided in a row for representing the digits from 1 to 9, and fourteen rows of punches, respectively cooperating with the fourteen punch actuators are provided. Punch actuators are movable in the direction of the arrow C between nine positions in which hammer 90 is located above different punches. Since punch card 64 is transported in a direction perpendicular to the direction of movement of punch actuator 63, shaft 65 and the eccentric circular cam 66 secured thereto are driven through a worm gear transmission 67, 68. A follower lever 69 carries a roller 70 cooperating with the circular periphery of cam 66 and being urged against the same by springs 78 and 71 while turning in counterclockwise direction about pivot 72. Spring 71 is secured to a stationary stud 98, and the other end of spring 78 is connected to a link 74 which is pivotally connected with the end of lever 69 by pivot 73 so that upon rotation of cam 66, link 74 is reciprocated. The end of link 74 carries a pin mounting a roller 77 which is guided along a horizontal guide face of a guide rail 79. A prismatic body 76 is guided between a pair of guide rails 79 and carries on a pivot pin 80, a coupling pawl 81 which is biased by spring 82 to snap into a notch of punch actuator 63 so that turning of cam 66 out of the illustrated position will cause turning of follower lever 69 in clockwise direction and movement of link 74, prismatic body 76, and punch actuator 63 in the direction of the arrow C. The guide body 76 and guide rails 79 assure an exactly straight movement of each punch actuator 63 so that the hammers 90 of the punch actuators move along the respective rows of punches 92.

Each punch actuator 63 has a row of recesses 89 respectively associated with the digits, only one recess 89 being shown in FIG. 11. A punching magnet 83 operates an armature 88 connected with an arresting pawl 87 which is turnable about a pivot 86 so that upon energization of punching magnet 83, arresting pawl 87 enters one of the recesses 89 in the respective punch actuator 63, and blocks the same. If hammers 90 of different punch actuators 63 are located over different punches 92, corresponding recesses are located under the respective arresting pawls 87 and are engaged by the same. Cam 65 carries ten fixed cams 84 which are axially spaced along shaft 65 to cooperate with the corresponding set of axially spaced switches 85. Cams 84 are shown in FIG. 11 displaced from cam 66, although cams 84 are located on the same shaft 65 as cam 66. Each punching magnet 83 is associated with a set of four brushes 5, 5a, 5b and 5c, as described with reference to FIGS. 9 and 10 and is energized under the control of cams 84 and switches 85, as will be described with reference to FIG. 12.

When a punching magnet 83 is energized, the arresting pawl 88 blocks the punch actuator 63.

When all punch actuators 63 are set in digital positions in which the respective hammers are located above punches associated with the respective digit, electromagnets 83 are actuated and block further movement of the punch actuator 63. Thereupon, a punching plate 94 is downwardly moved in a conventional manner to actuate all hammers 90 to move the respective correlated fourteen punches to a punching position penetrating card 64. Upon return of punching plate 94 to its higher inoperative position, springs 95 and 97 return the hammers 90 and punches 92 to the higher inoperative position.

When the punch actuators 63 are arrested, movement of lever 69 due to the action of cam 66 causes movement of the guide body 76 in the direction of the arrow C, and since the punch actuators 63 are blocked, coupling pawl 81 is urged out of the corresponding notch in punch actuator 63 and moves relative to the same in the direction of the arrow C.

After the punching operation, follower roller 70 again engages the low portion of eccentric cam 66 so that spring 71 turns lever 69 to a position in which body 76 moves so far opposite to the direction of the arrow C that coupling pawl 81 snaps again into the notch of the respective punch actuator 63, so that each punch actuator 63 is moved to the normal position shown in FIG. 11.

FIG. 12 illustrates the circuit for decoding the information read out by brushes 4, 5, and for energizing the punching magnets 83 accordingly.

The information read out by a set of brushes 5a, 5b, 5c, 5d in the four fields of the first area 3 of the "head" line of FIG. 1 is supplied to the decoding circuit 143 which is shown in FIG. 10. Assuming that card 64 is to be punched in four punching strokes in each of which fourteen positions are punched, brushes 5e, 5f, 5g and 5h read out the coded information in the four fields of the fifteenth area 3 of the "head" lines, and brushes 5i, 5k, 5l, and 5m read out the four fields of the ninth area 3 of the first text line so that the respective impulses are introduced into the "head" decoding circuit shown in FIG. 10, and into the line decoding circuit 145 which is shown in FIG. 9.

Switches 85 are consecutively closed by cam lugs 84, as shown in FIG. 11. In accordance with the value introduced by the respective group of brushes into the "head" decoding circuit or text line decoding circuit, upon closing of the switch 85 associated with the respective value or digit from 0 to 9, switches 146, 147 or 148, or 359, respectively are closed corresponding to the first, second or third punching stroke so that one of the punching magnets, described with reference to FIGS. 2 and 11 is energized and sets the respective punch actuator 63 by blocking the same in the correct digital position. The record carrier shown in FIG. 1 which has twenty areas 3 for each line, permits it to punch each card 65 in twenty areas for representing head information, and in twenty areas for representing text line information. Each punch card 64 can further be punched in sixteen positions to represent additional variable information. In the circuit of FIG. 12, switches 358 by which the desired values can be programmed are associated with the third position of the variable information, which is the first position of the fourth punching stroke. The programmed values of the variable information remain stored until a new value is introduced by closing of another switch 358.

The transporting of record carried 1, and the opening of switch 150, and the clearing of the head information takes place as described with reference to FIGS. 8, 9 and 10. When the head line of the record carrier 1 arrives under the brushes 5, switch 150 is closed again, and the read out information is supplied by brushes 5 to the head decoding device 143, 144, etc. and also into the line decoding device 144, etc. since the slide contact 151 is in contact with contact roller 33 and applies a voltage to brushes 5. When the first text line of record carrier 1 arrives in the region of the brushes 5, switch 152 is opened.

The head values stored in the line decoding device 145 are cleared, and the read out information of the first text line is introduced into the line decoding device 145. The holding voltages in lines 153 and 154 store the head line values in the head decoding circuits 143, 144 until a new record carrier is placed in the read-out device.

FIG. 12 illustrates only the left part of the entire circuit, which may be continued by showing the punching magnets 83 connected with headline decoding devices and text line decoding devices as shown in FIG. 12 for the first punching magnet 83, the following punching magnets 83 being correlated with the second and sixteenth areas 3 of the headline, with the tenth area 3 of the first text line, and with the fourth position in which variable information can be punched.

It will be understood that each of the elements described above, or two or more together, may also find a useful application in other types of punching apparatus differing from the types described above.

While the invention has been illustrated and described as embodied in an apparatus including a printing machine for printing information on cards and a punching device for punching the same information into the cards independently of the operation of the printing machine and being controlled by a record carrier operated in synchronism with the punching operations and independently of the printing operations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Record carrier controlled printing and recording apparatus comprising, in combination, a printing machine for imprinting cards with legible information; a recording device for recording said information on said cards; first and second means for actuating said printing machine and said recording device to perform on said cards printing and recording operations, respectively, independently of each other; read-out means connected with said recording device for setting the same to record read-out information; a transporting device for transporting to said read-out means, a record carrier having recordings representing said information; and control means connecting said recording device with said transporting device so that said record carrier is transported, said recording recordings are read out, and said recording device is set, in synchronism with said recording operations and independently of the operations of said printing machine.

2. Apparatus as claimed in claim 1 wherein said recording device includes recording means, and card transporting means for transporting imprinted cards from said printing machine to said recording means; wherein said transporting device includes a motor; and wherein said control means include switch means connected into the circuit of said motor and located in the path of movement of said card transporting means with the transported card and operated by the same to control said motor so that the information required for setting said recording means is read out by said read-out means and transmitted to said recording means.

3. Apparatus as claimed in claim 2 wherein said recording means is a punching device.

4. Apparatus as claimed in claim 2 comprising a series of control switches located in said path of said card transporting means and actuated when a transported card is in each of a series of recording positions in which said recording means record in different areas of the card; and circuit means connecting said control switches with said read-out means so that a series of parts of said information is consecutively read out and said recording means are set to record a part of said information on the card in each of said recording positions of the same.

5. Apparatus as claimed in claim 2 wherein said transporting device of said record carrier includes transmission means driven by said motor for stepwise moving said record carrier between a plurality of positions, said record carrier having lines of recordings respectively located under said read-out means in said positions of said record carrier; and wherein said switch means include a switch connected into the circuit of said motor for starting and stopping the same, and located in said path so that the information recorded in consecutive lines of said record carrier is recorded on cards which are consecutively transported to said recording means.

6. Apparatus as claimed in claim 5 wherein said circuit means includes relay means and switches controlled by said relay means; wherein the information is recorded in coded form in said lines of said record carrier; and comprising a decoding device connecting said read-out means with said recording means so that decoded information is recorded on said cards.

7. Apparatus as claimed in claim 6 wherein said decoding device includes switches and relays for the storage of information.

8. Apparatus as claimed in claim 5 wherein the first line of recordings of said record carrier represents a heading which is to be recorded on consecutive cards; and comprising storage means for storing the information read-out from said first line, and means for setting said recording means to record the information of said heading during successive recording operations on successive cards.

9. Apparatus as claimed in claim 5 wherein said recording means include recording members for recording additional variable information on said cards; and comprising circuit means including manually controlled switch means and storage means for said variable information and connected with said recording members for setting the same to record variable information in addition to the information provided by said record carrier.

10. Apparatus as claimed in claim 1, wherein said recording device includes recording means for said cards, and card transporting means for transporting imprinted cards from said printing machine to said recording means, and means connecting said recording means with said card transporting means so that cards are transported to said recording means in synchronism with the recording operations; and means connecting said card transporting means with said transporting device for actuating the same so that information required for setting said recording means is read out by said read-out means and transmitted to said recording means in synchronism with the recording operations of the same.

References Cited

UNITED STATES PATENTS 2,842,615   7/1958   Gruver _______________ 234—35

GERALD A. DOST, Primary Examiner